United States Patent
O'Reirdan et al.

(10) Patent No.: US 11,706,250 B2
(45) Date of Patent: *Jul. 18, 2023

(54) SECURE NOTIFICATION ON NETWORKED DEVICES

(71) Applicant: Comcast Cable Communications, LLC, Philadelphia, PA (US)

(72) Inventors: Michael J. O'Reirdan, Riverton, NJ (US); Jason D. Livingood, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 353 days.

This patent is subject to a terminal disclaimer.

(21) Appl. No.: 17/065,287

(22) Filed: Oct. 7, 2020

(65) Prior Publication Data

US 2021/0105287 A1     Apr. 8, 2021

Related U.S. Application Data

(63) Continuation of application No. 16/241,223, filed on Jan. 7, 2019, now Pat. No. 10,841,334, which is a continuation of application No. 14/456,958, filed on Aug. 11, 2014, now Pat. No. 10,218,738, which is a continuation of application No. 12/949,080, filed on Nov. 18, 2010, now Pat. No. 8,839,433.

(51) Int. Cl.
| | |
|---|---|
| *H04L 9/40* | (2022.01) |
| *G06F 21/55* | (2013.01) |
| *H04N 21/258* | (2011.01) |
| *H04N 21/475* | (2011.01) |
| *H04N 21/488* | (2011.01) |
| *H04N 21/643* | (2011.01) |

(52) U.S. Cl.
CPC .......... *H04L 63/145* (2013.01); *G06F 21/554* (2013.01); *H04L 63/1416* (2013.01); *H04N 21/25875* (2013.01); *H04N 21/4753* (2013.01); *H04N 21/4882* (2013.01); *H04N 21/64322* (2013.01); *H04L 63/18* (2013.01)

(58) Field of Classification Search
CPC ... H04L 63/145; H04L 63/1416; H04L 63/18; G06F 21/554; H04N 21/25875; H04N 21/4753; H04N 21/4882; H04N 21/64322
See application file for complete search history.

(56) References Cited

U.S. PATENT DOCUMENTS

| | | |
|---|---|---|
| 5,646,998 A | 7/1997 | Stambler |
| 5,852,665 A | 12/1998 | Gressel et al. |

(Continued)

OTHER PUBLICATIONS

Patryk Szewcyzk et al., Malware Detection and Removal: An examination of personal anti-virus software, Dec. 2008.

(Continued)

*Primary Examiner* — Ghodrat Jamshidi
(74) *Attorney, Agent, or Firm* — Banner & Witcoff, Ltd.

(57) ABSTRACT

A system, device and method to securely notify a user of a compromise of a device are provided. The system, device and method may include a detection device adapted for determining a compromise of the device communicatively coupled to the first path, a user database including at least information regarding the device and other devices associated with the user, and the secure signal path to at least one of the other devices.

31 Claims, 2 Drawing Sheets

(56) References Cited

U.S. PATENT DOCUMENTS

| | | |
|---|---|---|
| 6,973,166 B1 | 12/2005 | Tsumpes |
| 7,028,252 B1 | 4/2006 | Baru et al. |
| 7,299,361 B1 | 11/2007 | Kim et al. |
| 7,916,652 B1 | 3/2011 | Lima et al. |
| 8,370,474 B1 * | 2/2013 | Reeves ............... G06F 16/00 709/227 |
| 8,719,420 B2 | 5/2014 | Huber et al. |
| 9,195,981 B2 * | 11/2015 | Annan ............... G06Q 20/326 |
| 9,444,620 B1 * | 9/2016 | Murphy ............. H04L 63/0876 |
| 2002/0035699 A1 * | 3/2002 | Crosbie ............. H04W 12/069 713/153 |
| 2003/0065934 A1 | 4/2003 | Angelo et al. |
| 2003/0081776 A1 * | 5/2003 | Candelore .......... H04N 21/4516 375/E7.022 |
| 2003/0125961 A1 | 7/2003 | Janda |
| 2003/0200460 A1 | 10/2003 | Morota et al. |
| 2004/0031056 A1 | 2/2004 | Wolff |
| 2004/0053601 A1 * | 3/2004 | Frank ................. H04L 47/785 455/411 |
| 2004/0128353 A1 | 7/2004 | Goodman et al. |
| 2004/0205419 A1 | 10/2004 | Liang et al. |
| 2004/0225565 A1 | 11/2004 | Selman |
| 2004/0258158 A1 | 12/2004 | Gordon |
| 2005/0138353 A1 | 6/2005 | Spies et al. |
| 2005/0229256 A2 | 10/2005 | Banzhof |
| 2006/0064754 A1 | 3/2006 | Frank et al. |
| 2006/0272014 A1 | 11/2006 | McRae et al. |
| 2007/0006304 A1 | 1/2007 | Kramer et al. |
| 2007/0006308 A1 | 1/2007 | Desouza et al. |
| 2007/0117593 A1 | 5/2007 | Izdepski |
| 2007/0143593 A1 | 6/2007 | Cardoso |
| 2007/0248232 A1 * | 10/2007 | Driscoll ............ H04W 12/0431 713/153 |
| 2007/0290830 A1 | 12/2007 | Gurley |
| 2008/0056501 A1 * | 3/2008 | McGough ............... H04L 63/08 380/282 |
| 2008/0071874 A1 | 3/2008 | Roodman et al. |
| 2008/0086646 A1 * | 4/2008 | Pizano ................ H04L 63/0876 713/182 |
| 2008/0162338 A1 | 7/2008 | Samuels et al. |
| 2008/0235259 A1 | 9/2008 | Abernethy, Jr. et al. |
| 2008/0287123 A1 * | 11/2008 | Giloh ................ H04B 7/18567 455/12.1 |
| 2009/0038011 A1 | 2/2009 | Nadathur |
| 2009/0193514 A1 | 7/2009 | Adams et al. |
| 2009/0253406 A1 | 10/2009 | Fitzgerald et al. |
| 2009/0282483 A1 | 11/2009 | Bennett |
| 2009/0328216 A1 | 12/2009 | Rafalovich et al. |
| 2010/0058415 A1 | 3/2010 | Goergen et al. |
| 2010/0154059 A1 * | 6/2010 | McNamee ............... H04L 43/00 709/224 |
| 2010/0325007 A1 | 12/2010 | Ramaswamy |
| 2010/0325706 A1 | 12/2010 | Hachey |
| 2011/0119765 A1 | 5/2011 | Hering et al. |
| 2011/0138064 A1 | 6/2011 | Rieger et al. |
| 2011/0161452 A1 | 6/2011 | Poomachandran et al. |
| 2011/0213711 A1 * | 9/2011 | Skinner ............. G06Q 20/3829 455/410 |

OTHER PUBLICATIONS

Cheng et al., SmartSiren—Virus Detection and Alert for Smartphones, Jun. 2007.

Dai et al., MAPMon: A Host-Based Malware Detection Tool, IEEE, 8 pages (2007).

Antrosio et al., Malware Defense Using Network Security Authentication, IEEE, 12 pages (Year: 2005).

* cited by examiner

SECURE NOTIFICATION ON NETWORKED DEVICES

FIELD OF THE DISCLOSURE

The present disclosure is related to the field of malware protection, and, more specifically, to an apparatus, system and method for providing secure notifications on networked devices.

BACKGROUND

With regard to computers and intelligent devices, and particularly devices that operate using Internet Protocol (IP), there unfortunately are situations in which a third party may take over, or otherwise occupy with nefarious purpose, the computer or intelligent device. There are available systems that monitor for such threats of nefarious occupation, and these monitoring systems may detect when a malintended occupation is occurring. However, issues exist with implementing remedies even after determining that an occupation exists. Issues include assessing how best to eliminate the occupation, and deciding how best to alert a user that the nefarious occupation is occurring or has occurred.

One type of malintended occupation is "malware," which is short for malicious software. Malware is software designed to infiltrate a computer or intelligent device without consent of the user or owner. As used herein, malware includes computer viruses, worms, trojan horses, rootkits, backdoors, spyware, dishonest adware, crimeware and other malicious and unwanted software.

For malware to accomplish its malintended purpose, the malware must not be shut down or deleted by the user of the computer or intelligent device to be occupied. Concealment of the malware allows for an avoidance of deletion, and may in fact improve the chances that the malware will get installed in the first instance. That is, when malware is disguised as being innocuous or desirable, a user may be tempted to install, download, use or otherwise enable the malware.

Particularly common among the aforementioned types of malware are viruses, worms, spyware, trojan horses, and backdoors. Viruses and worms are often defined by the manner in which they spread. The term virus is typically used to define a program that has infected executable software and that may cause that software to spread the virus to other executable software. A worm, on the other hand, is generally defined as a program that actively transmits itself over a network to infect other computers. Viruses and worms may also contain a payload that is typically used to define the performance of other actions in addition to those defined immediately above.

Spyware includes programs designed to monitor a user's web browsing, display unsolicited advertisements, and/or redirect affiliate marketing revenues to the spyware creator. Spyware programs are generally installed by exploiting security holes, or may be packaged with user-installed software, such as peer-to-peer applications, for example.

A trojan horse is defined to include any program that invites the user to run it, and that conceals and/or delivers a harmful or malicious payload when run. The payload may take effect immediately and may lead to many undesirable effects, such as deleting the user's files or installing additional malicious or undesirable software.

A "backdoor" includes bypassing of normal authentication procedures. Once a system has been compromised (by one of the above methods, or by other known methods), one or more backdoors may be installed in order to allow malicious occupation in the future. Backdoors may also be installed prior to other malware, such as to allow attackers to subsequently enter.

Once malware is installed on a system, concealment, such as to avoid detection and disinfection, is essential, as mentioned hereinabove. The same is true when a human attacker, or "hacker," occupies a computer directly, with or without use of malware. Also, techniques often referred to as rootkits may allow concealment, such as by modifying the host operating system so that the malware is hidden from the user. For example, rootkits may prevent malware and/or a malicious process from being visible in a process list, or may keep malicious files from being read by the operating system. Additionally, some malware contains routines to defend against removal, including affirmative repelling of removal.

Malware creators may profit from malware by using the infected computers to do work for the creator. In such cases, the infected computers may be used as proxies to send out spam messages, for example. The use by spammers of infected computers may provide anonymity, thereby protecting the spammer from prosecution. For example, spammers have regularly used infected computers to target anti-spam organizations, and/or to distribute denial-of-service attacks.

In order to coordinate the activity of many infected computers, attackers may use malware in the form of coordinating systems known as botnets. In a botnet, a program operating as an agent for a user or another program (a "bot," short for robot program) logs onto a computer, such as via a chat channel. An attacker may then instruct many or all bot infected systems simultaneously. For example, botnets have been used to push upgraded malware to infected systems, thereby keeping infected systems resistant to updates, antivirus software and like security measures.

A malware creator may also profit by stealing sensitive information using the malware. For example, a key logger may be installed by or with malware to intercept a user's keystrokes, thereby allowing a nefarious party to obtain passwords, credit card numbers, or other information that may be exploited. Similarly, malware may copy a CD key, or passwords for online games, thus allowing the nefarious party to steal accounts or virtual items, for example.

In short, malware is highly undesirable, and may lead to various difficulties in computer use and operation, including the theft of information or personal credentials. Thus, when a computing device is infected and the infection becomes known, it is imperative that the malware be quarantined, processed and/or removed, preferably immediately and completely. This removal may prevent harm to the computer, data and credentials, and limits the possibility of spreading the malware to other computing devices on a network that may be connected to the infected computing device.

However, a great impediment in quarantining, processing and removing malware is the need to alert a user of an infected computing device that there is a problem, particularly in the aforementioned case when the malware is concealed. As discussed previously, if an IP connected device is infected by malware, it may also render antivirus or like defense mechanisms ineffective, and further may block notifications advising the user that an infection is present, and/or that the user is in danger of losing data or credentials. Further, such warnings may not only be blocked, but even when valid may be mistaken by the affected user for a spoofed notification from the attacker. Consequently, warnings to an end user that data may be stolen or an identity compromised are often ignored.

A need therefore exists for a secure method, system and device for delivering information and notifications from a trusted party to a user or a networked device.

SUMMARY OF THE DISCLOSURE

In one aspect, a system, device and method to securely notify a user of a compromise of a device connected to a first signal path over a secure signal path is disclosed. The system, device and method may include a detection device adapted for determining a compromise of a device communicatively coupled to the first path, a subscriber database including at least information regarding the compromised device, and a secure signal path over which a notification regarding the compromise is sent to a second device correspondent to the same user as the compromised device as indicated in the subscriber database.

In another aspect, by way of example, the disclosure describes at least a first path including at least a first path server, a detection device adapted for determining a compromise of a device that is communicatively coupled to the first path, a subscriber database including at least information regarding the device, and a secure path identified in accordance with the information. The secure path may be adapted to securely deliver at least one notification regarding remediation of the compromised device to a non-compromised device on the secure path.

The first path and the secure path may be under the control of the same service provider. The compromised device may be a computer, smart phone, a communication path, or the like, for example. The non-compromised device may be a television, a telephone, a smart phone, a computer or the like, for example.

A method for communicating information regarding a compromised computing device in accordance with the disclosure may include detecting a compromised device along a first path and correspondent to the user of the compromised device, checking subscriber details associated with the compromised device, determining a secure path, alternate to the first path and correspondent to the same user as the compromised device, to deliver the information regarding the compromised device, and delivering the information over the secure path.

Thus, aspects of the disclosure relate to a system, device and method for securely delivering information and notifications from a trusted party to a user or networked device.

BRIEF DESCRIPTION OF THE FIGURES

Understanding of the present disclosure will be facilitated by consideration of the following detailed description of the embodiments, taken in conjunction with the accompanying drawings, in which like numerals refer to like parts.

DETAILED DESCRIPTION

Figure 1:
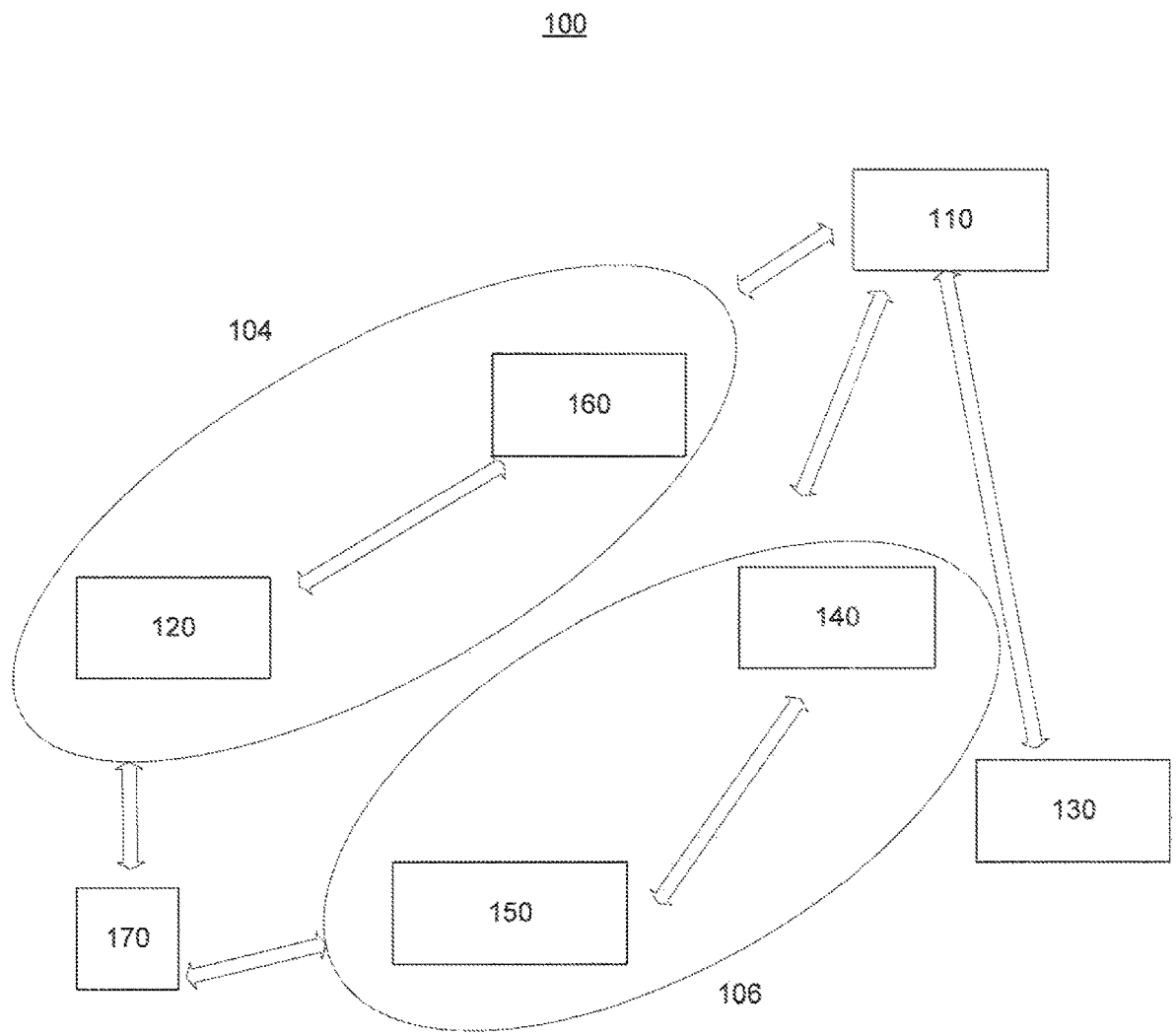
FIG. 1 illustrates a system for providing secure path notifications in accordance with some embodiments of the disclosure; and, FIG. 2 illustrates a method for providing secure notifications in accordance with some embodiments of the disclosure.

It is to be understood that the figures and descriptions have been simplified to illustrate elements that are relevant for a clear understanding, while eliminating, for the purpose of brevity, many other elements found in typical communication devices, systems and methodologies. Those of ordinary skill in the art will thus recognize that other elements and/or steps are desirable and/or required in implementing the disclosure. However, because such elements and steps are well known in the art, a discussion of such elements and steps may not be provided herein. The disclosure herein is directed to all such variations and modifications of such elements and methods known to those skilled in the art. Furthermore, the embodiments identified and illustrated herein are for exemplary purposes only, and are not meant to be exclusive or limited in their description.

The present disclosure is directed to notifying to a user of any form of compromise to the user's system, network or device, such as compromise by malware, effects thereof, or actions taken or effectuated by the malware. The notification may be via an alternative bandwidth, such as other than the bandwidth associated with the compromised device, wherein the alternative bandwidth may be under the secure control of a service or content provider, such as a Multi-System Operator (MSO) or similar entity. Although the disclosure herein is generally made with exemplary references to a MSO, those skilled in the art will appreciate, in light of the disclosure herein, that reference to an MSO or like provider includes reference to an internet service provider (ISP), a fiber optic network (FIOS) provider, a television/telephonic (TelecoTV) provider, and any other content or service providers.

The information provided in the notification may alert a user of the compromise. In an exemplary embodiment, a notification regarding a compromise of the user's computer on the provider network may be sent to another of the user's devices, such as a television screen, via the provider network(s). The notification, for example, may be similar in appearance to notifications of caller identity of a telephone caller delivered via television or another display device in a multi-path and/or multi-device provider network. Alternatively, the notification regarding the compromise may be delivered telephonically. The notification may originate from the provider, and thus may be made exceedingly difficult to infiltrate or spoof.

A device subject to compromise may include any network device, such as devices employing a network protocol, such as Internet Protocol (IP). Internet Protocol devices are referred to herein as IP connected devices. A compromise of an IP connected device on a network may be detected by a detection device. The detection device may be resident on the provider network, the user's network, or may be resident on a third party network. The user (e.g., subscriber or customer) may be notified via an alternate network connected device that the compromise has occurred. This notification may be delivered quickly and securely to the user, and may thereby allow for expedited remedial action.

More specifically, notification that the compromise has occurred may issue from the detection device, and a database query may be executed to establish user account details. User account details may include, for example, the IP address, Media Access Control (MAC) address or similar identifier of the compromised device, and additionally the IP or MAC address(es), telephone number, or similar identifier(s) of other devices associated with that user. For example, the database query may include a correlation to assess whether the user is also a television content subscriber. After the correlation, information, such as a notification, may be sent to a correlated device, such as a television or another display device, of the user; rather than to the compromised device of that user. The notification may warn the user that a security compromise has occurred, and a remedial action may be advised.

For example, remedial action may include advice for corrective action. Such advice may be directly or indirectly provided via the notification. For example, the advice may be provided indirectly, in whole or in part, at a secure location, such as in an encrypted email indicated as having been sent to the user's email account or to a particular computer or device. Such an encrypted email may, for example, require the use of a decryption key provided to an alternative device, such as a 6-8 digit PIN. Security may be enhanced by security measures, such as the PIN, to be used for decryption or to unzip contents of a notification, for example. Alternatively, the secure location where the notification is provided may include a web location, whereat the notification may be decrypted using a PIN provided on the television (or another display device), for example. Alternatively, a challenge-response test such as a captcha, may be displayed on the television, and the answer may be input by the user via a computer, for example. Such an entered response may allow access to a notification about the security compromise, for example. A notification that unequivocally comes from the provider, for example, has a higher degree of trustworthiness and is thus more likely to be acted upon by the user.

Referring now to FIG. 1, there is shown an exemplary system 100 for secure path notifications. System 100 may include a first path 104 of a provider network(s) including a first path server 160 and a device 120 that may be or may become compromised, a secure path 106 within the provider network(s) including a secure path server 140 and a secure path communication device 150, a detection device 110 for monitoring communications on first path 104 and for providing notification on secure path 106, and a database 130 which, for example, may contain information for correlating device 120 with the notification on secure path 106. System 100 may be used to verify authenticity for in band communications, which in this example include communications on first path 104, for example, and/or to prevent unauthorized access to in band communications.

Detection device 110 may include antivirus, spyware, occupation and/or invasion detection and/or protection, and/or like malware protection and/or detection systems or software. Protection and/or detection systems may include software from third parties, such as McAfee®, Norton®, and the like. Detection device 110 may detect and combat compromises effectuated by malware by providing real time protection against the installation or launch of malware software, and may detect and remove malware software that has already been installed. Detection device 110 may employ signature-based detection, such as by searching for known malicious patterns in executable code, or the like.

More specifically, detection device 110 may monitor network and user devices, such as device 120, such as the user's computer, for suspicious activity or behavior. If a compromise is detected, the source or reason for the compromise may be further investigated, such as by using signature-based detection and/or heuristic-based detection that identifies viruses by file analysis, by searching a suspect file for virus-like instructions and file emulation, by executing a program in a virtual environment and logging the actions performed, or like known detection methodologies, for example.

Detection device 110 may be communicatively coupled to the compromised device 120 via the first path 104, to which compromised device 120 is communicatively interconnected. The first path 104 may include the first path server 160. The first path server 160 may be a server that is dedicated to the first path 104, or a server that also functions elsewhere in system 100. As used herein, a server may be a hardware device or group of devices that delivers content, such as a web page or other content, when requested by a device, such as compromised device 120, for example. Detection device 110 may also be interconnected to, or have access to information stored within, database 130. Detection device 110 may also have access to, and/or interconnection with, secure path communication device 150 via secure path server 140. Detection device 110 may reside at a provider's location, or may reside at a location closer to or at a user's premises, or may reside both at the provider and local levels, for example.

Detection device 110 may provide notification when a compromise, such as an infection, invasion, attack and/or occupation, of one or more device(s) 120 is detected. Such a notification may identify the compromised device as in danger of being or having been compromised, and/or provide instructions for remedying the compromise. Instructions may be provided, for example, via secure path server 140 for output on device 150. Detection device 110 may scan incoming and/or outgoing data, such as network data, for malware. For example, files may be scanned, such as at download, and components known to represent malware may be blocked or removed after scanning. Detection device 110 may intercept attempts to install items, such as start-up items, or to modify settings, such as browser settings, for example. Similarly, removal and detection mechanisms at detection device 110, and/or at device 120, may scan the contents of an operating system's registry, operating system files, and installed application programs of the user computer, and may provide a list of any threats found. A user may choose from the list which files to delete or keep, or may compare the list to a list of known malware, or may otherwise cause execution of one or more actions to rectify a problem, for example.

Detection device 110 may be any device, such as a combination of software and hardware, configured for employing detection for compromises, including known or unknown forms of, or effects of, malware. Detection may include review of incoming packets, scanning outgoing data, analyzing DNS traffic, and the like. Further, detection device 110 may employ cloud detection, wherein reporting is provided in conjunction with analysis of the reporting. Such analysis may be performed within system 100 and/or by a third party. For example, in a detection cloud, members of the cloud and/or users accessing the cloud may vote or submit information or notifications identifying a compromise or likely compromise to detection device 110. Based on votes and/or submissions, the detection cloud may correlate the submitted information and may submit this information for remedial action or additional detection, for example. The detection cloud may weigh votes/submissions based on factors, such as history of votes/submissions by the submitter, veracity of previous submissions, level of service provided, and/or other differentiating factors, for example. Reporting by votes/submissions may occur off-network and/or outside system 100, for example.

Device 120 may be a user device such as personal computer, portable computer, laptop, palmtop, mobile computing device and/or wearable computer, personal digital assistant/enterprise digital assistant, smartphone, IPTV, car-puter, ultra-mobile PC, a computing communication path, an intelligent appliance, such as a digital picture frame, power supply, smart refrigerator, other intelligent devices generally controlled by or operated using software, or any other known type of computing device. Device 120 may also be a network device that is attached to a network, and that may be compromised and monitored. Device 120 may be used and operated by a provider of services or content, or a user 170. Device 120 may typically receive/transmit information via the first path 104, and may thus be operably connected to first path server 160.

Secure path 106 may include secure path server 140 and secure path communication device 150. Secure path 106 may comprise one or more secure communication paths via which the notification may be sent. Secure path 106 may include, but not be limited to, communication paths for data, television content, telephone, cellular and similar secure delivery signals for networked devices. Secure path 106 communication may be under similar control as first path 104, for example, but such common control is not required. Secure path 106 may provide communication that is reliable and secure to allow a notification that a compromise exists, and/or to provide remedial action for compromised device 120.

Remedial action may include advice for corrective action. Such advice may be directly or indirectly provided via the notification. For example, the advice may be provided, in whole or in part, at a secure location, such as in an encrypted email, short message system (SMS) message or similar notification sent to the user's computer, television, or smart phone, for example. Such an encrypted email may, for example, employ a decryption key, such as a 6-8 digit PIN. Security may be enhanced by security measures, such as the PIN, and/or encryption, and/or zipping the contents of the notification, for example.

For example, a user may be assigned a PIN, such as at subscription, and may be asked to enter the PIN to obtain a notification, such as via a television. Additionally, a PIN, such as a PIN assigned at subscription, may be provided to the user to allow the user to verify that the sender of the notification is the provider, or a like-trusted source. Alternatively, the secure location at which the advice is provided may include a web location, whereat the notification may be decrypted using a PIN provided on the television, for example. Alternatively, a captcha may be displayed on the television, and the answer input to a web form via computer. Such an entered captcha may allow access to a notification about the security compromise, for example. Simply put, a notification that unequivocally comes from a provider such as an MSO, for example, has a higher degree of trustworthiness and is thus, based on the aforementioned or similar verification methodologies, more likely to be acted upon by the user.

Remedial action may additionally include direction to or effectuation of an outsource of the remedial action. Outsourcing may be to a third party for identifying the need for corrective action, for determining appropriate corrective action, for initiating and/or for instituting corrective action(s), and/or for overseeing corrective action, for example.

Secure path server 140 may include a server or other type of controller, such as a bandwidth controller or limiter, for intermediate control of, or contribution to, communication with the user. Server 140 may include, for example, a settop box, an edge or gateway server, an IP television (IPTV) or a telephone switch. Further, server 140 may provide an identifying address, or node, for the delivery of information to the correspondent user device, for example.

Communication device 150 may include any communication device that visually or audibly communicates information to a user, including a television, a telephone, a computer, a portable wireless device, an intelligent appliance, and the like. Device 150 may provide information to a user in a form that the user may interpret and make determinations based upon. Communicated information may include a direct notification, and/or a PIN, captcha, or other key that may be used to access information. Communicated information may thus include instructions that may help a user identify, quarantine, block, remove and/or otherwise clean malware from compromised device 120.

Database 130 may include and/or provide information or protocols for a secure path notification, and may take the form of a searchable database, for example. Database 130 may perform a lookup or other similar database search, such as to, determine means of communication with user 170, other than via the compromised device 120, after a determination is made that device 120 is compromised, for example. Many providers may maintain database registrations of system users, including interrelations of internet, television and phone users, for example. Such database registration may be used to allow database 130 to identify an appropriate secure path 106 over which to contact user 170 of device 120 in the event of a compromise, Database 130 may be used to verify authenticity of a user on first path 104, and/or prevent unauthorized access to first path 104. Database 130 may include information, such as information regarding IP or MAC addresses, telephone numbers and like information, about one or more users, and about the node or nodes on which that user's device or devices reside. This information may thus be correlated information regarding one or multiple provider services that are provided to the same user, and, more specifically, regarding one or multiple service paths that may be used by the provider for secure communication with the user.

First path 104, including the first path server 160, may comprise a typical communication network used by device 120 to communicate with, for example, a service provider. First path server 160 may communicate using known protocols, such as Hyper Text Transfer Protocol (HTTP). For example, if device 120 is a personal computer, communication via the first path 104 may occur through a packet network server, acting as first path server 160, over a local or wide packet switched data network. For the exemplary computer, first path 104 may include a link from an ISP to the user's computer, including an in-home router. As such, first path 104 may be a wired connection, such as via coaxial cable, a fiber optic connection, and/or a wireless connection, for example. Additionally, first path 104 may include combinations of different connections types, such as a fiber optic link to curbside, a coaxial connection from curbside to an in-home router, and a wireless connection from router to computer. The same path 106 may, for example, share many or all of the same components as first path 104, but may operate in a different bandwidth, for example.

Figure 2:
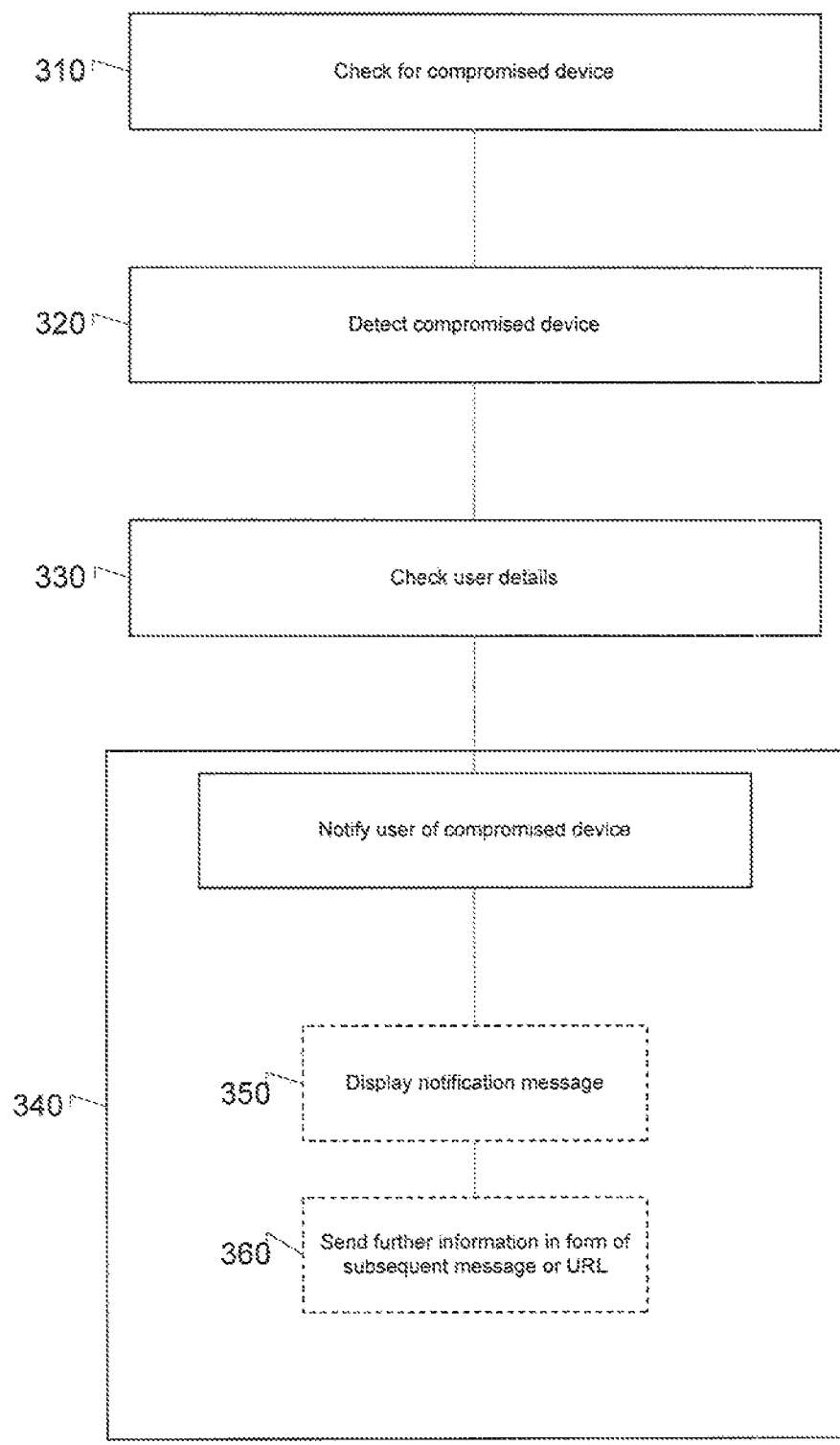

Referring now to FIG. 2, there is shown an exemplary method for providing secure notifications. Method 300 may include checking for a compromised device at step 310. At step 320, method 300 may include detecting a compromised device. Method 300 may also include checking user-related details at step 330, and notifying the user of compromised device at step 340. Step 340 may include displaying notification at step 350 (e.g., on a non-compromised device associated with the user), and may further or alternatively include sending furl her information, such as in the form of a subsequent message or URL, at step 360. The notification and/or subsequent message at step 340 may provide details for remediating the compromised device, and may be sent to non-compromised device associated with the user.

Checking for the compromised device at step 310 may include executing antivirus and/or malware software on a particular network communication path, networked device or other devices. This execution may be at a local level, such as at the compromised device, at a provider level, or distributed at intermediate or multiple locations, for example.

Detecting a compromised device at step 320 may include an assessment that a device is infected or otherwise compromised. Detection at step 320 may include providing a listing of potential infections found on a compromised device, such as a listing of found registry errors and files resident on the compromised device, at step 310.

Checking the subscriber details at step 330 may include verifying that the compromised device is registered to a user. Step 330 may additionally include identifying the user. Further, checking subscriber details at step 330 may include comparing the user information of the user of the compromised device to determine potential alternative paths for securely contacting the user, including, but not limited to, paths via television, computer, phone and portable device paths, as well as other services that are provided by the provider to the user of the compromised device.

Notifying the user of the compromised device at step 340 may include a notification to the user associated with the compromised device, such as a secure notification regarding the potential or existing compromise of the compromised device. Such a notification may include information for correcting the compromise, and/or may include a key and/or code to be used to obtain further aspects of the secure notification and/or to contact the provider, for example.

Displaying the notification at step 350 may include displaying the notification over the secure network. Step 350 may include displaying the notification on a television screen, on a telephone or voicemail, via computer, such as via email, via a portable wireless device, such as via SMS, or the like, for example.

Sending a further remediation notification at step 360 may include providing remediation instructions to a user of the compromised device. These instructions may, for example, include further secure remediation information, such as a URL for further receipt of secure notifications. The remediation may include instructions to remove or disable malware, for example.

In the foregoing description, reference is made to acts, symbolic representations, and operations that are performed by one or more computers, unless indicated otherwise. As such, it will be understood that such acts, representations and operations include the manipulation by the processing unit of at least one computer of electrical signals representing data in a structured form. This manipulation transforms the data or maintains the data at locations in the memory system of the computer. The manipulation reconfigures or otherwise alters the operation of the computer in a manner well understood by those skilled in the art. The data are maintained at physical locations of memory associated with the computer. However, all acts, representations and operations described herein need not comprise computer-executable code, as those of skill in the art will appreciate that several of the acts, representations and operations described may also be implemented in hardware, for example.

Although the disclosure has been set forth and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the disclosure as set forth above and in the claims hereinafter.

The invention claimed is:

1. A method comprising:
   receiving, via a first path, an indication of one or more occurrences of malware on a user device;
   after receiving the indication, sending, via a first band of a secure path, an encrypted message that indicates a remedial action for the malware and is decryptable based on a decryption code;
   sending, via a second band of the secure path, the decryption code for output via a first computing device;
   receiving a response that indicates successful user input of the decryption code; and
   allowing, based on the response, the user device to access information associated with the remedial action for the malware.

2. The method of claim 1, wherein the first band of the secure path is a data communication band and the second band of the secure path is a video-streaming band.

3. The method of claim 1, wherein the first computing device comprises at least one of: a video-content device, a set-top box, or a digital video recorder.

4. The method of claim 1, further comprising determining, based on stored information associated with the user device, that the first computing device is a video-content device that is associated with the user device.

5. The method of claim 1, wherein sending the encrypted message comprises sending the encrypted message to a second computing device that is different from the first computing device.

6. The method of claim 1, further comprising sending, to the user device, the information associated with the remedial action.

7. The method of claim 1, wherein the information associated with the remedial action comprises at least one of: remediation information comprising a uniform resource locator associated with instructions to address the malware; remediation information comprising an email message accessed by the user device; or remediation information comprising a short message system (SMS) message.

8. The method of claim 1, wherein the malware comprises at least one of: a computer virus, a computer worm, a trojan horse, a rootkit, a backdoor program, spyware, malicious adware, or crimeware.

9. The method of claim 1, wherein the secure path is a wired connection.

10. An apparatus comprising:
    one or more processors; and
    memory storing instructions that, when executed by the one or more processors, cause the apparatus to:
    receive, via a first path, an indication of one or more occurrences of malware on a user device;
    after receiving the indication, send, via a first band of a secure path, an encrypted message that indicates a remedial action for the malware and is decryptable based on a decryption code;
    send, via a second band of the secure path, the decryption code for output via a first computing device;
    receive a response that indicates successful user input of the decryption code; and
    allow, based on the response, the user device to access information associated with the remedial action for the malware.

11. The apparatus of claim 10, wherein the first band of the secure path is a data communication band and the second band of the secure path is a video-streaming band.

12. The apparatus of claim 10, wherein the first computing device comprises at least one of: a video-content device, a set-top box, or a digital video recorder.

13. The apparatus of claim 10, wherein the instructions, when executed by the one or more processors, further cause the apparatus to determine, based on stored information associated with the user device, that the first computing device is a video-content device that is associated with the user device.

14. The apparatus of claim 10, wherein the instructions, when executed by the one or more processors, cause the apparatus to send the encrypted message by sending the encrypted message to a second computing device that is different from the first computing device.

15. The apparatus of claim 10, wherein the secure path is a wired connection.

16. The apparatus of claim 10, wherein the instructions, when executed by the one or more processors, further cause the apparatus to send, to the user device, the information associated with the remedial action.

17. The apparatus of claim 10, wherein the information associated with the remedial action comprises at least one of: remediation information comprising a uniform resource locator associated with instructions to address the malware; remediation information comprising an email message accessed by the user device; or remediation information comprising a short message system (SMS) message.

18. A non-transitory computer-readable medium storing instructions that, when executed, cause a computing device to:
  receive, via a first path, an indication of one or more occurrences of malware on a user device;
  after receiving the indication, send, via a first band of a secure path, an encrypted message that indicates a remedial action for the malware and is decryptable based on a decryption code;
  send, via a second band of the secure path, the decryption code for output via a first computing device;
  receive a response that indicates successful user input of the decryption code; and
  allow, based on the response, the user device to access information associated with the remedial action for the malware.

19. The non-transitory computer-readable medium of claim 18, wherein the first band of the secure path is a data communication band and the second band of the secure path is a video-streaming band.

20. The non-transitory computer-readable medium of claim 18, wherein the first computing device comprises at least one of: a video-content device, a set-top box, or a digital video recorder.

21. The non-transitory computer-readable medium of claim 18, wherein the instructions, when executed, cause the computing device to send the encrypted message by sending the encrypted message to a second computing device that is different from the first computing device.

22. The non-transitory computer-readable medium of claim 18, wherein the secure path is a wired connection.

23. The non-transitory computer-readable medium of claim 18, wherein the instructions, when executed, cause the computing device to send, to the user device, the information associated with the remedial action.

24. The non-transitory computer-readable medium of claim 18, wherein the information associated with the remedial action comprises at least one of: remediation information comprising a uniform resource locator associated with instructions to address the malware; remediation information comprising an email message accessed by the user device; or remediation information comprising a short message system (SMS) message.

25. A system comprising:
  a first computing device, comprising one or more first processors and first memory; and
  a second computing device, comprising one or more second processors and second memory,
  wherein the first computing device is configured to:
    receive, via a first path, an indication of one or more occurrences of malware on a user device;
    after receiving the indication, send, via a first band of a secure path, an encrypted message that indicates a remedial action for the malware and is decryptable based on a decryption code;
    send, via a second band of the secure path, the decryption code for output via the second computing device;
    receive a response that indicates successful user input of the decryption code; and
    allow, based on the response, the user device to access information associated with the remedial action for the malware, and
  wherein the second computing device is configured to:
    receive the decryption code.

26. The system of claim 25, wherein the first band of the secure path is a data communication band and the second band of the secure path is a video-streaming band.

27. The system of claim 25, wherein the second computing device comprises at least one of: a video-content device, a set-top box, or a digital video recorder.

28. The system of claim 25, wherein the first computing device is further configured to determine, based on stored information associated with the user device, that the second computing device is a video-content device that is associated with the user device.

29. The system of claim 25, wherein the first computing device is further configured to send the encrypted message by sending the encrypted message to a third computing device that is different from the second computing device.

30. The system of claim 25, wherein the first computing device is further configured to send, to the user device, the information associated with the remedial action.

31. The system of claim 25, wherein the information associated with the remedial action comprises at least one of: remediation information comprising a uniform resource locator associated with instructions to address the malware; remediation information comprising an email message accessed by the user device; or remediation information comprising a short message system (SMS) message.

* * * * *

UNITED STATES PATENT AND TRADEMARK OFFICE
CERTIFICATE OF CORRECTION

PATENT NO. : 11,706,250 B2
APPLICATION NO. : 17/065287
DATED : July 18, 2023
INVENTOR(S) : O'Reirdan et al.

It is certified that error appears in the above-identified patent and that said Letters Patent is hereby corrected as shown below:

In the Specification

Detailed Description, Column 8, Line 22:
Delete "compromise," and insert --compromise.--

Detailed Description, Column 8, Line 63:
Delete "furl her" and insert --further--

Signed and Sealed this
Third Day of September, 2024

Katherine Kelly Vidal
*Director of the United States Patent and Trademark Office*